United States Patent
Guazzoni et al.

(10) Patent No.: US 6,789,432 B2
(45) Date of Patent: Sep. 14, 2004

(54) ELECTROMAGNETIC FLOWMETER FOR LINES FOR CONVEYING AND DISTRIBUTING ELECTRICALLY CONDUCTING LIQUIDS

(75) Inventors: Roberto Guazzoni, Carugate (IT); Stefano Frigo, Montagnana (IT)

(73) Assignee: Hemina S.p.A., Padua (IT)

( * ) Notice: Subject to any disclaimer, the term of this patent is extended or adjusted under 35 U.S.C. 154(b) by 0 days.

(21) Appl. No.: 10/259,400

(22) Filed: Sep. 30, 2002

(65) Prior Publication Data

US 2003/0061886 A1 Apr. 3, 2003

(30) Foreign Application Priority Data

Oct. 3, 2001 (IT) .................................. MI2001A002050

(51) Int. Cl.[7] .................................................. G01F 1/58
(52) U.S. Cl. ................................................... 73/861.12
(58) Field of Search ........................ 73/861.12, 861.13, 73/861.14–861.17

(56) References Cited

U.S. PATENT DOCUMENTS

| | | | |
|---|---|---|---|
| 3,924,466 A | * 12/1975 | Medlar ..................... | 73/861.12 |
| 3,927,451 A | 12/1975 | Thomas | |
| 4,614,121 A | * 9/1986 | Hansen et al. ........... | 73/861.12 |
| 4,635,486 A | * 1/1987 | Jacobsen et al. ......... | 73/861.12 |
| 4,774,844 A | * 10/1988 | Davis ....................... | 73/861.12 |
| 6,539,981 B1 | * 4/2003 | Kleven et al. ............. | 138/143 |
| 6,571,642 B1 | * 6/2003 | Feller ....................... | 73/861.12 |

FOREIGN PATENT DOCUMENTS

GB      2 314 902      1/1998

* cited by examiner

*Primary Examiner*—Edward Lefkowitz
*Assistant Examiner*—Jewel V. Thompson
(74) *Attorney, Agent, or Firm*—Guido Modiano; Albert Josif; Daniel O'Byrne

(57) ABSTRACT

An electromagnetic flowmeter for measuring a flow rate in lines for conveying and distributing electrically conducting liquids, comprising a flowmeter body forming a substantially cylindrical open ended chamber, delimited by side walls of electrically insulating material. The flowmeter body accommodates a pair of facing electrodes arranged at diametrically opposite regions of said chamber and a magnetic field generator generating induction lines orientated at right angles to a line connecting the electrodes and to the chamber axis. The electrodes can be connected to a measuring device for measuring the potential difference induced between the electrodes by the fluid flow in the presence of said magnetic field. Two sleeves on the flowmeter body provide an extension of the chamber ends. The sleeves are flexible and fit hermetically over two duct portions along which the flow-rate is to be measured.

7 Claims, 3 Drawing Sheets

ELECTROMAGNETIC FLOWMETER FOR LINES FOR CONVEYING AND DISTRIBUTING ELECTRICALLY CONDUCTING LIQUIDS

BACKGROUND OF THE INVENTION

The present invention relates to an electromagnetic flowmeter for measuring flow rates in lines for conveying and distributing electrically conducting liquids.

Electromagnetic flowmeters for electrically conducting liquids are known. Said flowmeters generally comprise a rigid tubular body that is lined internally with a layer of electrically insulating material. Said layer accommodates two coils, which are supplied with electric power so as to generate a magnetic field with magnetic induction lines that pass through the tubular body and are orientated substantially at right angles to its axis.

Two electrodes are arranged on the internal surface of the electrically insulating body in two diametrically opposite regions, so that the imaginary line that connects the electrodes is substantially perpendicular to the induction lines of the magnetic field.

The flowmeter is connected, by means of the axial ends of the tubular body, to the two segments of a duct along which the flow-rate is to be measured. According to the requirements, the ends of the tubular body can be flanged, threaded or flattened in order to be interposed between two mating flanges (an embodiment commonly known as wafer).

These flowmeters are provided with a converter, which can be mounted on the tubular body or can be arranged remotely with respect to said body. The converter usually comprises a microprocessor that controls the power supply of the coils for generating the magnetic field and is connected to the pair of electrodes so as to detect the potential difference generated between the electrodes. The microprocessor can be connected to a display, which presents visually the flow-rate, which is correlated to the sensed potential difference, or can be connected to another remote monitoring element that constantly monitors the flow-rate measured by the electromagnetic flowmeter.

The operation of these flowmeters is based on Faraday's law regarding the induction of an e.m.f. at the ends of a conductor of length l moving at a velocity v within a magnetic field. According to this law, in fact, $$e = k \cdot B \cdot l \cdot v$$

where B is the magnetic induction produced in the conductor by the magnetic field, e is the e.m.f., and k is a scale constant. In the flowmeter being considered, l is the length of the fluid thread that, in each instant, connects the two electrodes. Since the intensity of the magnetic field, i.e., B, is usually constant, and since the passage section of the tubular body in the sensing region is constant, the flow-rate Q is:

$$Q = K \cdot e$$

The converter, by detecting the potential difference e between the electrodes and multiplying it by K, automatically provides the value of the flow-rate Q.

These kinds of flowmeter ensure high reliability in operation and excellent precision in the measurement made (on the order of +/−0.2% of the sensed value), but have the problem of having high manufacturing costs.

On the other hand, in many fields that can accept less precise measurements, such as for example in water distribution, the need is felt to have flowmeters that have low purchase and installation costs.

SUMMARY OF THE INVENTION

The aim of the present invention is to provide an electromagnetic flowmeter for measuring flow rates in lines for conveying and distributing electrically conducting liquids, which can be manufactured and installed with considerably lower costs than those entailed by conventional types of electromagnetic flowmeter.

Within this aim, an object of the invention is to provide a flowmeter that despite having a reduced production cost nonetheless ensures a measurement precision that is capable of fully meeting the requirements of various fields of application.

This aim and these and other objects that will become better apparent hereinafter are achieved by an electromagnetic flowmeter for measuring flow rates in lines for conveying and distributing electrically conducting liquids, comprising a flowmeter body that forms a substantially cylindrical chamber, which is delimited by side walls made of electrically insulating material and is open at its ends; said flowmeter body accommodating a pair of mutually facing electrodes arranged in two diametrically opposite regions of the lateral surface of said chamber and means for generating a magnetic field with induction lines that are orientated substantially at right angles to the line that connects said pair of electrodes and to the axis of said chamber; said pair of electrodes being connectable to means for measuring the potential difference induced between said electrodes by the flow of an electrically conducting liquid through said chamber in the presence of said magnetic field, characterized in that said flowmeter body has two sleeves that extend said chamber at its ends, said sleeves being flexible and suitable to be fitted hermetically over the two duct portions along which the flow-rate is to be measured.

BRIEF DESCRIPTION OF THE DRAWINGS

Further characteristics and advantages of the invention will become better apparent from the description of a preferred but not exclusive embodiment of the flowmeter according to the invention, illustrated only by way of non-limitative example in the accompanying drawings, wherein.

DESCRIPTION OF THE PREFERRED EMBODIMENTS

Figure 1:
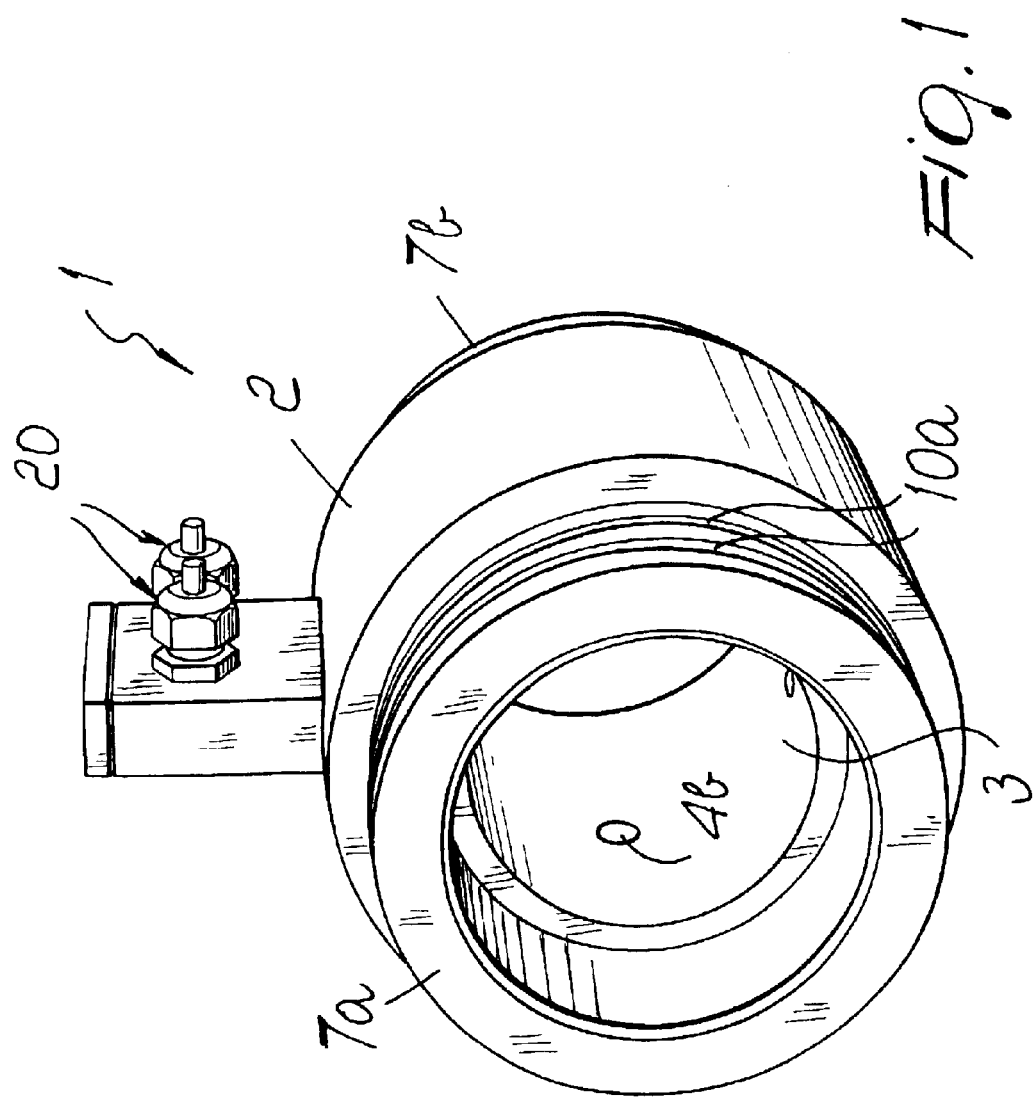
FIG. 1 is a perspective view of the flowmeter according to the invention.
Figure 2:
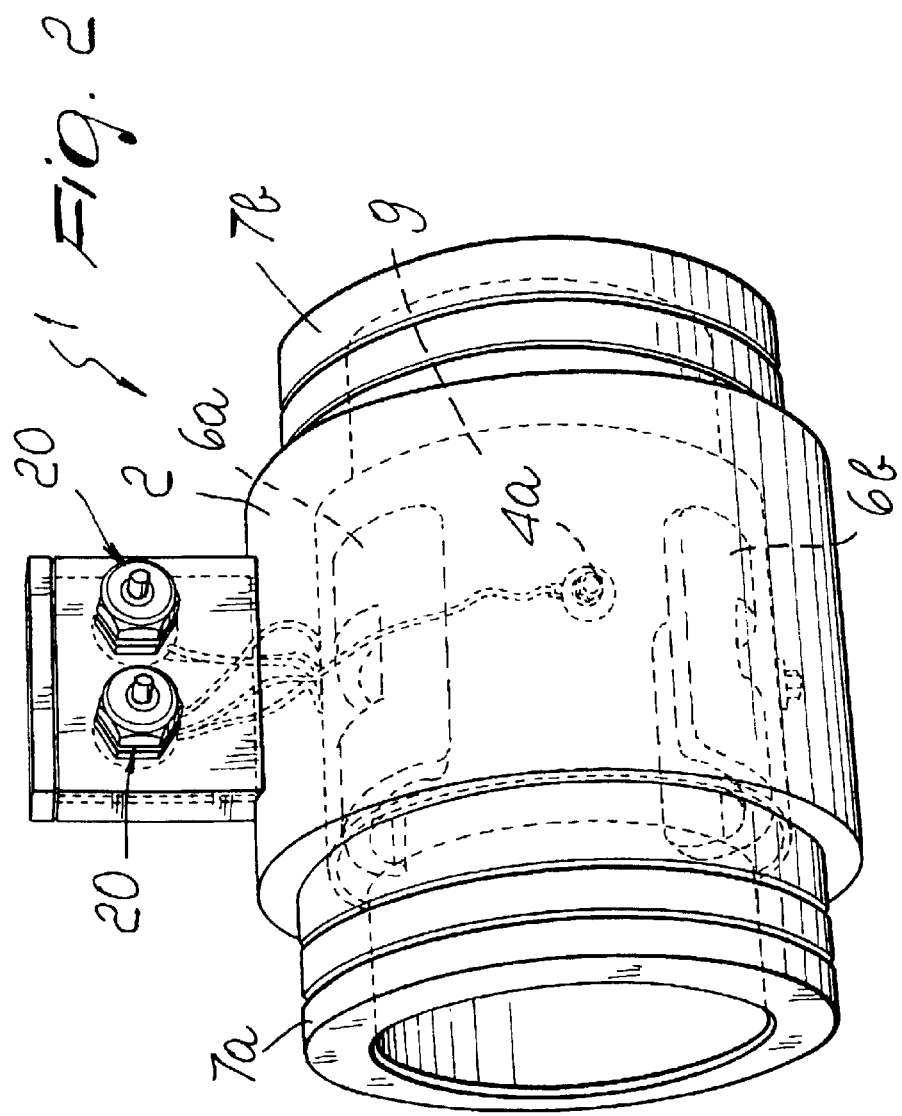
FIG. 2 is another perspective view of the flowmeter, taken from a different angle with respect to FIG. 1 and shown in phantom lines in order to illustrate the internal components.
Figure 3:
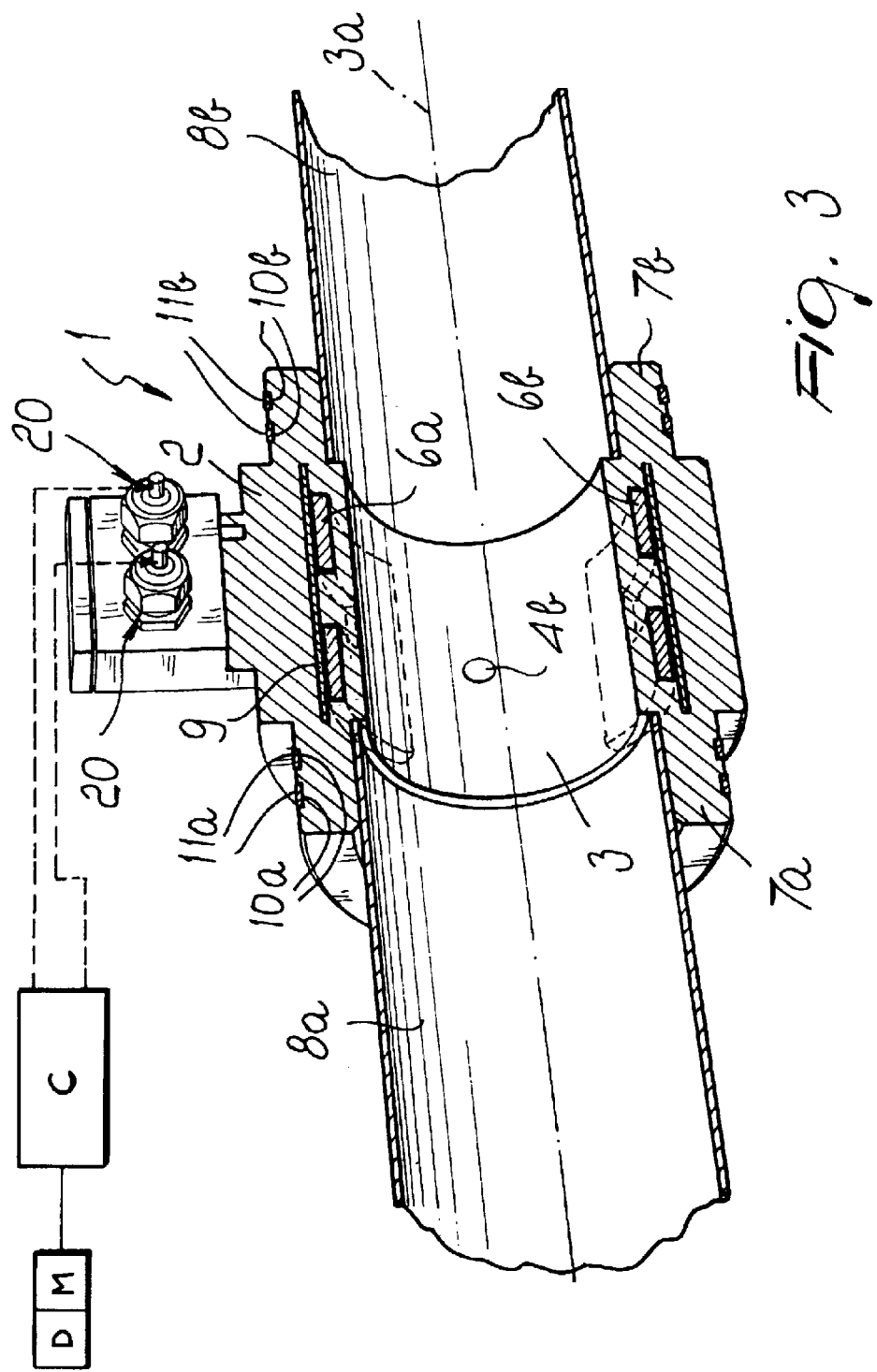
FIG. 3 is an axial sectional view of the flowmeter according to the invention, fitted on a duct.

With reference to the figures, the flowmeter according to the invention, generally designated by the reference numeral 1, comprises a flowmeter body 2, which forms a substantially cylindrical chamber 3 that is delimited by side walls made of electrically insulating material and is open at its ends.

The flowmeter body 2 accommodates two electrodes 4a and 4b, which face each other and are arranged in two mutually diametrically opposite regions on the lateral surface of the chamber 3.

The body of the flowmeter 2 also accommodates means for generating a magnetic field and the position of said magnetic field generation means is such as to obtain magnetic induction lines that are orientated substantially at right angles to the line that connects the pair of electrodes 4a and 4b and to the axis 3a of the chamber 3.

The pair of electrodes 4a and 4b can be connected, in a per se known manner, to means M for measuring the potential difference induced between is the electrodes 4a and 4b by the axial flow of an electrically conducting liquid through the chamber 3 in the presence of the magnetic field.

The means for generating the magnetic field are conveniently constituted by two electromagnets 6a and 6b, which are provided with windings that are meant to be supplied with electric power by way of power supply cables connected to suitable contacts of connectors 20, which are arranged on, or otherwise can be accessed from, the outside of the flowmeter body 2. The electromagnets 6a and 6b are arranged in two mutually diametrically opposite regions of the flowmeter body 2, preferably offset at 90° with respect to the electrodes 4a and 4b about the axis 3a of the chamber 3.

According to the invention, the flowmeter body 2 has two sleeves 7a and 7b that form an extension of the chamber 3 at its ends. The sleeves 7a and 7b are elastically deformable and can be fitted hermetically over the two tubular segments 8a and 8b of the duct along which the flow-rate is to be measured.

Preferably, the sleeves 7a and 7b are arranged coaxially to the chamber 3.

Conveniently, the flowmeter body 2 is made of molded synthetic material, preferably polyurethane resin, and the sleeves 7a and 7b are formed monolithically with the flowmeter body 2.

The two electromagnets 6a and 6b and the two electrodes 4a and 4b are preferably mounted on a cylindrical supporting element 9, which is substantially rigid, for example made of metal, and are embedded with it inside the body of the flowmeter 2 during the molding of said body 2. It should be noted that during molding the material that constitutes the flowmeter body 2 lines internally the supporting element 9 so as to form the electrically insulating lateral surface of the chamber 3.

Advantageously, the outer surface of the sleeves 7a and 7b is provided with one or more recessed annular seats 10a and 10b, which are meant to accommodate hose clamps 11a and 11b by way of which the sleeves 7a and 7b are rigidly and hermetically connected to the tubular segments 8a and 8b.

The electrodes 4a and 4b can be connected, by way of electrical cables that run inside the body of the flowmeter 2, to contacts of the connectors 20 which are arranged externally to, or otherwise can be accessed from, the outside of the body of the flowmeter 2 in order to be connected to a converter C of a known kind, which is arranged externally to the flowmeter according to the invention.

As an alternative, said converter can also be arranged on the body of the flowmeter 2 or even be embedded in the body of the flowmeter 2, according to the requirements.

The converter, of a known type, is constituted by a microprocessor-based instrument that generates the appropriate levels (intensity and frequency) of the magnetic field by supplying electric power to the electromagnets 6a and 6b and amplifies and processes the electrical signal that arrives from the electrodes 4a and 4b, processing the flow-rate measurement and returning it in output in various forms according to requirements.

The converter can be connected to a display D, which is connected to the body of the flowmeter or is arranged remotely and on which the measured flow-rate is presented visually, or can be connected to another remote monitoring element that constantly monitors the flow-rate measured by the electromagnetic flowmeter.

The operation of the flowmeter according to the invention is as follows.

By supplying power to the electromagnets 6a and 6b, a magnetic field is generated which preferably has a constant magnetic induction and has induction lines orientated at right angles to the axis of the duct on which the flowmeter is mounted and at right angles to the line that connects the electrodes 4a and 4b. The flow of the electrically conducting liquid through the flowmeter generates, according to the known Faraday law cited above, a potential difference between the electrodes 4a and 4b that is directly proportional to the velocity and therefore to the flow-rate of the liquid through the flowmeter. This potential difference is processed by the converter, which provides the value of the flow-rate. Essentially, the potential difference detected between the electrodes 4a and 4b is equal to the potential difference generated at the ends of the liquid thread which, in each instant, connects the two electrodes 4a and 4b and can be likened to a conductor that moves within the magnetic field generated by the electromagnets 6a and 6b.

In practice it has been found that the flowmeter according to the invention fully achieves the intended aim, since by virtue of its particular structure it can be manufactured and installed with extremely low costs.

Another advantage of the flowmeter according to the invention is that it can be installed simply and rapidly even on ducts that are already installed without requiring particular operations for adapting the duct.

The flowmeter thus conceived is susceptible of numerous modifications and variations, all of which are within the scope of the appended claims; all the details may further be replaced with other technically equivalent elements.

In practice, the materials used, so long as they are compatible with the specific use, as well as the dimensions, may be any according to the requirements and the state of the art.

The disclosures in Italian patent Application No. MI2001A002050 from which this application claims priority are incorporated herein by reference.

What is claimed is:

1. An electromagnetic flowmeter for measuring a flow rate in a line for conveying and distributing electrically conducting liquids, comprising a flowmeter body that forms a substantially cylindrical chamber, having an axis, and which is delimited by side wails forming a lateral surface made of electrically insulating material and is open at opposite ends thereof which are connected to tubular segments of the line through which a flow rate has to be measured; a pair of mutually facing electrodes arranged in two diametrically opposite regions of the lateral surface of said chamber; field generating means for generating a magnetic field with induction lines orientated substantially at right angles to an imaginary line that connects said pair of electrodes and to the axis of said chamber; measuring means connected to said electrodes for measuring a potential difference induced between said electrodes by the flow of an electrically conducting liquid flowing through said chamber and said magnetic field; and two sleeves that form an extension of said chamber at the ends thereof, said sleeves being flexible and arranged for hermetic fitting over the two tubular segments of the line along which the flow-rate is to be measured.

2. The electromagnetic flowmeter of claim 1, wherein said generating means for generating the magnetic field comprise two electromagnets that are accommodated in said flowmeter body in two regions that are diametrically mutually opposite with respect to said chamber.

3. The electromagnetic flowmeter of claim 2, wherein said flowmeter body is made of synthetic molded material and in that said sleeves are formed monolithically with said flowmeter body.

4. The electromagnetic flowmeter of claim 3, wherein said flowmeter body and said sleeves an made of polyurethane resin.

5. The electromagnets flowmeter of claim 3, comprising a supporting element, said electromagnets and said electrodes being mounted on said supporting element and embedded with said supporting element in the synthetic material that constitutes said flowmeter body.

6. The electromagnetic flowmeter of claim 1, wherein said sleeves are arranged coaxially to said chamber.

7. The electromagnetic flowmeter of claim 6, further comprising: hose clamps and recessed annular seats for accommodating the hose clamps, and which are formed on an outer lateral surface of said sleeves.

* * * * *